United States Patent [19]
B. A. Barker

[11] Patent Number: 4,883,022
[45] Date of Patent: Nov. 28, 1989

[54] ANIMAL WATERER

[76] Inventor: B. A. Barker, 339 South Cedar, Monticello, Iowa 52310

[21] Appl. No.: 192,417

[22] Filed: May 9, 1988

[51] Int. Cl.⁴ .............................................. A01K 7/00
[52] U.S. Cl. ...................................................... 119/73
[58] Field of Search ........................ 119/72, 73, 78, 61

[56] References Cited

U.S. PATENT DOCUMENTS

| | | | |
|---|---|---|---|
| 1,569,738 | 1/1926 | Forshee | 119/73 |
| 1,574,756 | 3/1926 | Peterson | 119/73 |
| 1,839,595 | 1/1932 | Ritchie | 119/73 |
| 3,745,977 | 7/1973 | Martin | 119/73 |
| 3,943,889 | 3/1976 | Sparber | 119/73 |
| 4,138,967 | 2/1979 | Tamborrino | 119/78 |
| 4,309,962 | 1/1982 | Boozer . | |
| 4,320,720 | 3/1982 | Streed . | |
| 4,433,642 | 2/1984 | LeRoy | 119/78 |
| 4,559,905 | 12/1985 | Ahrens | 119/73 |
| 4,633,815 | 1/1987 | Peterson et al. | 119/72 |
| 4,646,687 | 3/1987 | Peterson et al. | 119/73 |
| 4,704,991 | 11/1987 | Moore | 119/73 |
| 4,708,091 | 11/1987 | Schafer | 119/73 |
| 4,739,727 | 4/1988 | Boyer | 119/73 |

FOREIGN PATENT DOCUMENTS 640718  1/1979  U.S.S.R. ................................. 119/73

OTHER PUBLICATIONS

Soudersburg Sales & Manufacturing–Advertising Material, Gordonville, PA.
The Watering Station, Inc.–Advertising Material, Ocala, FL.
Thermo-Bucket–Advertising Material.

Primary Examiner—Gene Mancene
Assistant Examiner—R. Thomas Price
Attorney, Agent, or Firm—Allan L. Harms

[57] ABSTRACT

An improved animal waterer which provides a cover having a depending polygonal basin with ports in the sidewalls of the basin. The cover overlies a water container such that the basin engages water in the container. A float which glides vertically along a pair of guides allows an animal to depress the float angularly while preventing removal of the float from the basin. A sloped, ribbed bottom of the container facilitates draining and cleaning of the container.

24 Claims, 3 Drawing Sheets

ANIMAL WATERER

BACKGROUND OF THE INVENTION

The present invention relates to livestock watering devices and in particular to those devices which are equipped with heating devices.

A few generations ago, a livestock waterer was an open tub placed in the livestock pen or yard where it would make water available to the cattle, hogs, horses or other animals placed in the pen or yard. Automatic filling systems were then developed but in areas where subfreezing temperatures occur, the defrosting method of choice was the use of a hammer or other strong tool which would break up the ice formed on the water surface in water. Later heating devices were added to these open tubs to assist in maintaining the water in a liquid state, nonetheless freezing still occurs. As heating costs become higher and of more concern, various attempts have been made to better insulate the water container to retain more of the heat within the stored water. Insulation material has been added to the outer shell of the water container and attempts have been made to insulate the upper surface of the water. Typical of this attempt is the device disclosed in U.S. Pat. No. 4,646,687, where a floating circular cover rests atop the water within a generally cylindrical tube which extends into the water. The floating cover may be tilted by the animal seeking water, thereby allowing the animal access to the water below. It is well known that cattle and other large domesticated farm animals will operate such a device.

Insulated cover technology is disclosed in U.S. Pat. No. 3,745,977, though the claimed improvement of U.S. Pat. No. 4,646,687 over the earlier patent is the sizing of the cover to be smaller than the opening such that the cover is less likely to freeze to the surrounding opening.

The shortcoming of the technology taught in U.S. Pat. No. 3,745,977 and 4,646,687 is that the cover is free floating within the waterer's opening. Though the free float of the cover appears to be useful in making it easy for the animals to gain access to the water in the waterer, it also allows the animal to grasp the cover in its mouth and to remove it or damage it. If not removed by the animal, the cover may be depressed far enough to be displaced laterally from the opening and become trapped below the waterer's lid away from the opening therein. This obviously deprives the device of the specific function it was to accomplish, that is, to provide an insulating barrier between the water in the waterer and the outside air.

SUMMARY OF THE INVENTION

The instant invention provides a livestock waterer with improved insulation and operational features.

An insulation containing surround receives a water container which is equipped with a sloping bottom and water supply and float valve members. Heating elements are installed in a lower portion of the water container. A cover assembly is fashioned to overlie the water container and is provided with at least one basin element which depends downward from the cover assembly into the water which is supplied to the water container. Openings are provided in the sides and bottom of the basin element to enable the interior of the basin to communicate with the interior of the water container. A raised platform formed upon the cover assembly provides hatch access to the float valve and heater assemblies from the top of the waterer. Guides are receivable in a barrier member such that the barrier member may freely move along the guides in a generally vertical direction of movement. The guides are fastened at the ends thereof to the cover assembly such that the barrier is free to move up and down within the basin and also free to be tilted or displaced relative to the basin bottom. An indicator light is provided in a recess upon the outer surface of the surround to show heater operation from a distance. The top surface of the cover assembly is provided with a raised shoulder surrounding the basin opening to reduce the effect of drippage of water or saliva from an animal's mouth on to the surface adjacent the basin opening where it could freeze and interfere with operation of the barrier element. Openings in the sides and bottom of the basin result in reduced turbulence of the water in the water container thereby reducing the amount of water emitted from the overflow and wasted.

One object of the invention is to provide a livestock waterer which reduces the amount of energy needed to prevent the water in it from freezing.

Another object of the invention is to provide an improved livestock waterer with an insulating barrier between the water in the waterer and the outside air which can be operated by the animal seeking water but which cannot be removed by the animal or deflected by the animal into a position where its function is disabled.

Another object of the invention is to provide an improved livestock waterer which can be serviced conveniently from the top thereof.

Another object of the invention is to provide an improved animal waterer which will not tend to freeze its insulating barrier to its surrounding surfaces when animals drip water or saliva onto the waterer in freezing temperatures.

These and other objects of the invention will be apparent from the detailed description which follows.

DETAILED DESCRIPTION OF THE INVENTION

Figure 1:
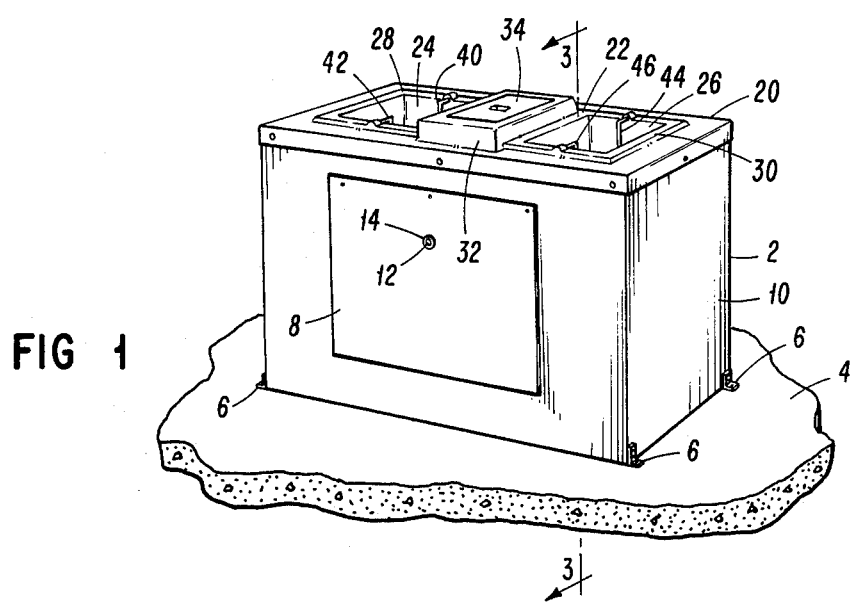
FIG. 1 is a front perspective view of the invention.

Referring now to the drawings, the livestock waterer invention 2 can be seen in perspective in FIG. 1, positioned upon ground 4. Lugs 6 retain invention 2 to ground 4 at each corner of invention 2. Panel 8 is removably fastened to housing 10 and may be removed to provide access to interior components. Pilot light 12 resides in recess 14 of panel 8 and gives indication of power being applied to the heating elements of invention 2. Pilot light 12 is illustrative of indicators which may alternatively be provided to indicate other conditions such as the filling of water into invention 2.

Figure 3:
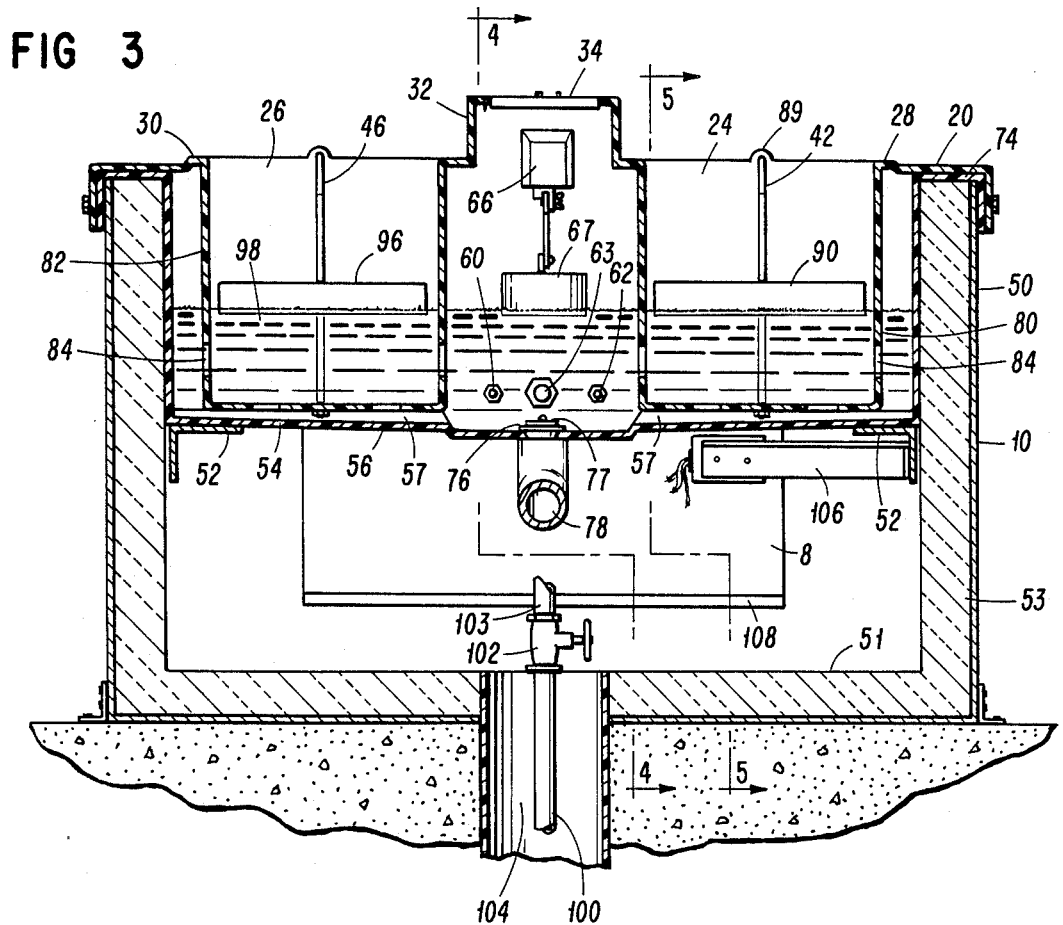
FIG. 3 is a cross sectional view taken along line 3—3 of FIG. 1.
Figure 2:
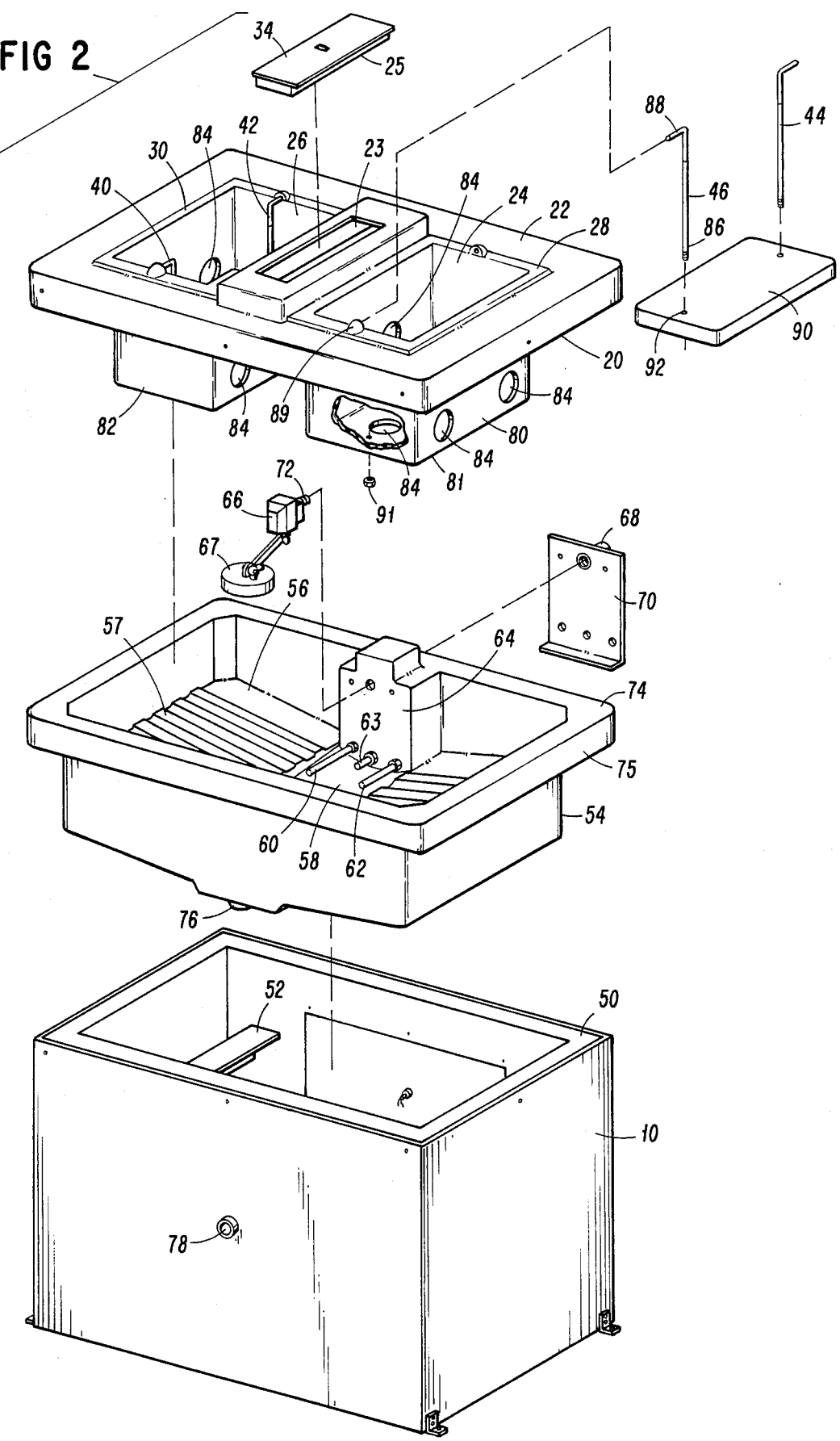
FIG. 2 is an exploded perspective view of the invention.

Cover 20 resides atop housing 10 and in the preferred embodiment is provided with two openings 24 and 26 which open into polygonal basins 80 and 82, as seen in FIGS. 2 and 3. Shoulders 28 and 30 encompass the periphery of each of openings 24 and 26 respectively. Shoulders 28 and 30 are preferably molded as part of cover 20. Platform 32, in the preferred embodiment, extends above top surface 22 of cover 20 and is provided with hatch 34 which is removable to allow access to water supply valve 66 and float 67, which would be expected to need servicing from time to time. Guides 40, 42, 44 and 46 can be seen affixed to shoulders 28 and 30 and extend generally vertically into basins 80 and 82.

In FIG. 2, an exploded view of the components of invention 2 can be seen. Housing 10 is provided with insulation filled sidewall 50. Shelf 52 is mounted within housing 10 and is intended for support of container 54 thereon. Container 54 is preferably made of molded, durable plastic and is provided with a bottom 56 which is sloped bilaterally. Generally identical slopes are provided which descend from the sides of container 54 toward central portion 58 of bottom 56. Bottom 56 is provided with longitudinal ribs which follow the slopes of bottom 56. Heating elements 60 and 62 extend into container 54 from bulkhead 64. Thermostat 63 also extends from bulkhead 64. Valve assembly 66 is provided with pipe fitting 72 which passes through bulkhead 64 and mounts to pipe junction 68 at plate 70.

Lip 74 surrounds the periphery of container 54 and rests upon sidewall 50 of housing 10. Drain 76, which may be slectively opened by access through hatch 34, depends from bottom 56 at central region 58. Drain 76 engages outlet duct 78 which passes through sidewall 50.

Cover 20 rests atop container 54. Basins 80 and 82 depend from cover 20 into the interior of container 54. Each basin is provided with ports 84 in the walls thereof. Guide 46 comprises a formed rod having a generally vertically extending leg 86 which mounts to bottom 81 of basin 80 with fastener 91. Arm 88 of guide 46 generally depends perpendicularly from leg 86 and is mounted to cover 20 at mount 89.

Float 90 is provided with opening 92 through which guide 46 passes such that float 90 may freely glide along guide 46. Opposing guide 44 is generally identical to guide 46 and mounts similarly to cover 20 and through opening 93 of float 90. Guides 46 and 44 are arranged in generally diametrically opposing fashion relative to opening 24. Float 90 is then free to slide vertically upon guides 46 and 44 within basin 80. Openings 92 and 93 are sized sufficiently larger than guides 46 and 44 so that non-binding vertical movement of float 90 is possible and float 90 may rock axially.

Shoulder 28 surrounds top opening 24 of basin 80 and is slightly raised above the level of top surface 22 of cover 20. Second basin 82 provided in cover 20 is to be understood as generally identical in features to basin 80.

Hatch 34 is provided with insulator 25 which seats within service opening 23. Hatch 34 is selectively removable from opening 23. Access to the float 67 and valve assembly 66, along with drain plug 77, is available through service opening 23 when hatch 34 is removed.

Figure 4:
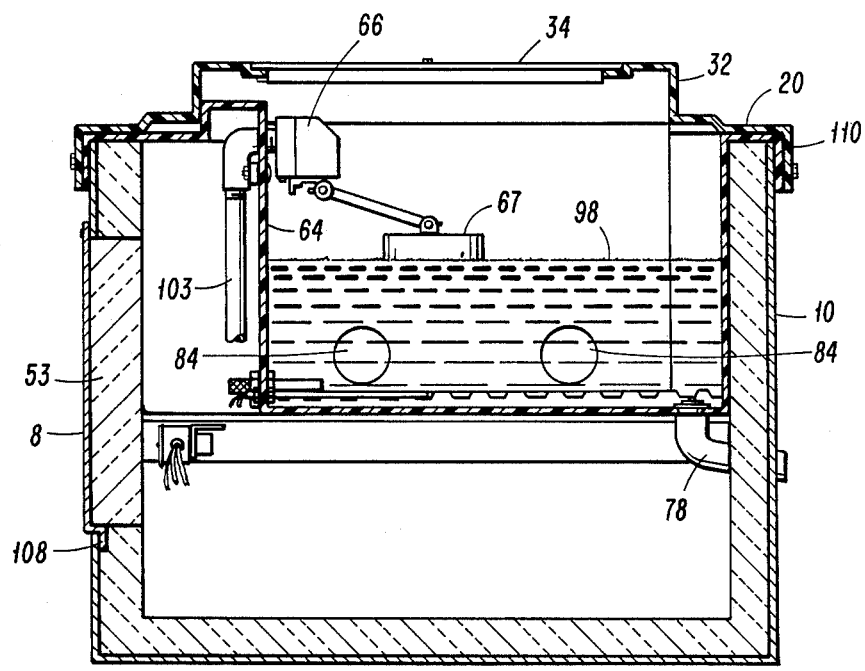
FIG. 4 is a view in section taken along line 4—4 of FIG. 3.
Figure 5:
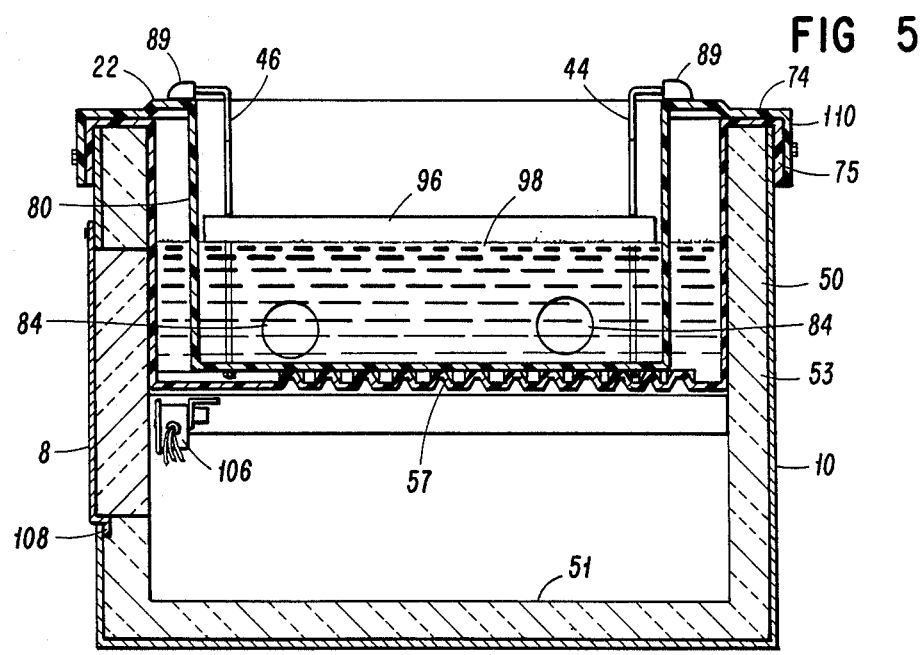
FIG. 5 is a view in section taken along line 5—5 of FIG. 3.

Referring now to FIGS. 3, 4 and 5, more detail of the invention can be visualized through the cross sectional views presented. Housing 10 supports container 54 upon sidewall 50 and upon shelves 52 and 53. Cover 20 rests upon lip 74 of container 54. Ribs 57 are molded upon sloping bottom 56 and the corrugations of said ribs 57 provide increased strength for the support of water 98 placed within container 54. Basins 80 and 82 rest on a portion of ribs 57. Floats 90 and 96 are sufficiently buoyant to rest upon water 98. Floats 90 and 96 are preferably constructed of insulating material encapsulated in a stiff plastic skin. Floats 90 and 96 are generally flat and are constructed to generally match the shape of openings 24 and 26 of basins 80 and 82. The retention of float 90 on guides 44 and 46 and of float 96 on guides 40 and 42, permit floats 90 and 96 to rise and fall with the water level within the container 54 while also permitting angular deflection of floats 90 and 96 about the axes defined between guides 40 and 42 and guides 44 and 46. Each of floats 90 and 96 is free to operate independently of the other.

Valve assembly 66 and associated float 67 are of well known technology, as are heating element 60 and thermostat 63. Each of these components are mounted to bulkhead 64 and are flanked by basins 80 and 82 in the preferred embodiment. Float 67 is forced upward as water 98 rises within container 54, thereby closing valve assembly 66 to stop inflow of water from water supply pipe 103. The provision of hatch 34 upon access opening 23 of cover 22 provides a novel feature for obtaining service access to valve assembly 66, float 67 and drain plug 77 in drain 76.

Sidewall 50 and floor 51 of housing 10 are filled with thermal insulating material 53 which is solid foam in the preferred embodiment. Water supply pipe 100 enters housing 10 through duct 104 and connects to supply valve 102. Pipe 103 interconnects supply valve 102 to pipe junction 68. Access to water supply valve 102 is available upon removal of selectively detachable panel 8. Panel 8 is fashioned with lip 108 which seats on sidewall 50 to provide simplified removal of panel 8. Panel 8 is faced with insulating material, preferably rigid foam, on its inward face.

Drain outlet duct 78 communicates with drain 76 which is provided with removable plug 77. Wiring enclosure 106 is provided to allow conjunction of electrical wiring to thermostat 63, heating elements 60 and 62, and to exterior electrical power.

Flange 110 of cover 20 overlies sidewall 75 of lip 74 of container 54. Water 98 supplied to container 54 passes through ports 84 in the walls of basins 80 and 82, thereby maintaining consistent water pressures in container 54 and in basins 80 and 82. Ports 84 are sized to permit flow without allowing unnecessary turbulence generated within basins 80 or 82 to be transmitted to water 98 in container 54 outside basins 80 and 82. Such turbulence can trigger unnecessary control activity by float 67.

Guides 46 and 44 associated with float 90 can be seen fixed at one end of each to mounts 89 formed on shoulder 22 of cover 20 and at opposing ends fastened to the lower portion of basin 80.

In the preferred embodiment, cover 20, shoulders 28 and 30, basins 80 and 82 and platform 32 are of unitized construction, from rigid, tough plastic.

OPERATION OF THE INVENTION

Water is provided to valve assembly 66 until float 67 rises sufficiently to cause closing of valve assembly 66. Floats 90 and 96 rise atop water 98 and follow paired guides 44 and 46 and 40 and 42 respectively. Floats 90 and 92 are situate within polygonal basins 80 and 82 respectively but are sized to provide a small gap between the edges thereof and the inner walls of basins 80 and 82. Shoulders 28 and 30 surround basins 80 and 82 respectively and to provide a surface which promotes drain off of liquids from cover 20 near basins 80 and 82. This drain off reduces the potential for liquids to creep from top surface 22 down the inner walls of basins 80 and 82 where such liquids would freeze in freezing temperatures, thereby interfering with the free movement of floats 90 and 96. When a cow or other animal for which the invention is provided, desires water, it nuzzles downward on float 90, and thereby deflects float 90 about the axis defined between guides 40 and 42 thereby submerging a portion of float 90. Guides 40 and 42 associated with float 90 insure that float 90 may not be removed from basin 80. Yet float 90 may be dislocated sufficiently to provide access to water for the thirsty animal. The down thrust by an animal upon float 90 creates turbulence which is largely contained within basin 80.

When it is desired to empty invention 2, panel 8 may be removed to reach supply valve 102 to close it and then hatch 34 may be removed to allow access to drain plug 77 for its removal from drain 76. Water then may be drained through drain outlet 78 to the exterior of invention 2. The sloping bottom of container 54 provides enhanced emptying and cleaning of container 54. The utilized construction of cover 20 allows its removal from container 54 so that thorough cleaning of sloped bottom of container 54 may be accomplished.

When servicing is necessary for float valve assembly 66 or float 67, access can easily be obtained through opening 23 when hatch 34 is removed.

The lower walls of basins 80 and 82 provide barriers to the transmittal of turbulence from water within basins 80 or 82 to water in container 54 outside basins 80 and 82. Additionally, guides 40 and 42 coupled with the enclosed lower wall of basin 80 provide obstacles to the displacement of float 90 from within the confines of basin 80. It is impossible for float 90 to be submerged and displaced below a vertical sidewall of basin 80 by an animal seeking water. Likewise it is impossible for an animal to grasp float 90 in its mouth and remove it from basin 80.

The provision of pilot light 12 in recess 14 on panel 8 provides indication of heater operation from a remote viewing position, thus improving inspectability of the invention for proper function of the heater portion of the device.

In the foregoing description, the invention has been described in connection with preferred embodiments, but it should be understood that the description does not intend to limit the invention to the embodiments described. Rather, this description is intended to include such alternatives, modifications and equivalents as may be included in the sphere and scope of this invention, as more particularly set forth in the claims.

Having thus described the invention, I claim:

1. Apparatus for watering animals, the invention comprising
   a container to hold water,
   a cover overlying said container,
   said cover having at least one polygonal basin depending downward therefrom,
   said basin having at least one port in a wall thereof,
   said basin being open at its intersection with said cover,
   said basin communicating at its interior with water contained within said container,
   a float positioned within said basin,
   said float being sufficiently buoyant to float upon water contained within said basin,
   said float slideably engaging at least one guide member mounted to said basin,
   said guide member being generally vertically disposed within said basin,
   said float substantially covering the water positioned within said basin, 2. The invention of claim 1 wherein
   said float being horizontally sized to provide a gap between said float and the sidewalls of said basin.

3. The invention of claim 2 wherein
   said cover includes a raised portion thereof surrounding said opening of said basin.

4. The invention of claim 3 wherein
   said container is provided with a drain outlet within the bottom thereof, said cover includes a removable hatch therein overlying said drain outlet of said container.

5. The invention of claim 4 wherein
   said container is provided with heating means to provide heat to the water in said container,
   said container is provided with thermostat means to regulate said heater means, an indicator is provided on the outside of said apparatus to indicate operation of said heater means.

6. The invention of claim 5 wherein
   said container is provided with a sloped bottom and a drain opening at the lowermost portion thereof.

7. The invention of claim 6 wherein
   said sloped bottom is provided with ribs thereon parallel to the direction of slope of said bottom of said container.

8. The invention of claim 1 wherein
   said cover includes a raised portion thereof surrounding said opening of said basin.

9. The invention of claim 1 wherein
   said container is provided with a drain outlet within the bottom thereof, said cover includes a removable hatch therein overlying said drain outlet of said container.

10. The invention of claim 1 wherein
    said container is provided with heating means to provide heat to the water in said container,
    said container is provided with thermostat means to regulate said heater means, an indicator is provided on the outside of said apparatus to indicate operation of said heater means.

11. The invention of claim 1 wherein
    said container is provided with a sloped bottom and a drain opening at the lowermost portion thereof.

12. The invention of claim 11 wherein
    said sloped bottom is provided with ribs thereon parallel to the direction of slope of said bottom of said container.

13. The invention of claim 1 wherein
    said float being horizontally sized to provide a gap between said float and the sidewalls of said basin,
    said cover includes a raised portion thereof surrounding said opening of said basin, said container is provided with heating means to provide heat to the water in said container,
    said container is provided with thermostat means to regulate said heater means, said container is provided with a sloped bottom and a drain opening at the lowermost portion thereof.

14. The invention of claim 1 wherein
    said basin is provided with a plurality of ports in the walls thereof.

15. The invention of claim 1 wherein
    said cover is provided with a second polygonal basin depending downward from said cover, said second basin is generally identical to said at least one basin, a second float is positioned within said second basin, said second float is sufficiently buoyant to float upon water in said second basin, said second float substantially covers said water positioned in said second basin.

16. The invention of claim 15 wherein said floats being horizontally sized to provide a gap between said floats and the sidewalls of said basins, said cover includes raised portions thereof surrounding said openings of said basins, said container is provided with a sloped bottom and a drain opening at the lowermost portion thereof, said sloped bottom is provided with ribs thereon parallel to the direction of slope of said bottom of said container, said cover includes a removable hatch therein overlying said drain opening of said container, said container is provided with heating means to provide heat to the water in said container, said container is provided with thermostat means to regulate said heater means, an indicator is provided on the outside of said apparatus to indicate operation of said heater means.

17. The invention of claim 16 wherein each of said basins are provided with a plurality of ports in the walls thereof, each of said floats engage a second generally vertically disposed guide member, said guide members are diametrically opposed in their engagement with said floats.

18. Apparatus for watering animals, the invention comprising a container to hold water, a cover overlying said container, said cover having at least one polygonal basin depending downward therefrom, said basin having at least one port in a wall thereof, said basin being open at its intersection with said cover, said basin communicating at its interior with water contained within said container, a float positioned within said basin, said float being sufficiently buoyant to float upon water contained within said basin, said float slideably engaging at least one guide member mounted to said basin, said guide member being generally vertically disposed within said basin, said float substantially covering the water positioned within said basin, said float engages a second generally vertically disposed guide member, said guide members are diametrically opposed in their engagement with said float.

19. Apparatus for watering animals, the invention comprising a container to hold water, a cover overlying said container, said cover having formed therein at least one chamber depending downward therefrom, said chamber being open at its intersection with said cover, said chamber having a port therein and communicating at its interior with water contained within said container, a float positioned within said chamber, said float being sufficiently buoyant to float upon water contained within said chamber, said float slideably engaging at least one guide member mounted to said chamber, said guide member being generally vertically disposed within said chamber, said float substantially covering the water positioned within said chamber.

20. The invention of claim 19 wherein said float engages a second generally vertically disposed guide member, said guide members are diametrically opposed in their engagement with said float.

21. The invention of claim 20 wherein said float being horizontally sized to provide a gap between said float and sidewalls of said chamber.

22. The invention of claim 20 wherein said cover includes a raised portion thereof surrounding said opening of said chamber.

23. The invention of claim 20 wherein said container is provided with a sloped bottom and a drain opening at a lowermost portion thereof.

24. The invention of claim 23 wherein said sloped bottom is provided with ribs thereon parallel to the direction of slope of said bottom of said container.

* * * * *